United States Patent [19]

Ozaki

[11] 4,145,641

[45] Mar. 20, 1979

[54] AUTOMATICALLY-OPENABLE-AND-CLOSABLE-DOOR OPERATING APPARATUS

[76] Inventor: Kazuyoshi Ozaki, 9-1, Asahigaokacho, Suita-shi, Osaka, Japan

[21] Appl. No.: 833,699

[22] Filed: Sep. 15, 1977

[30] Foreign Application Priority Data

Mar. 19, 1977 [JP] Japan ................................ 52-30882

[51] Int. Cl.$^2$ ................................ H02P 7/36

[52] U.S. Cl. ................................ 318/269; 318/266; 318/282

[58] Field of Search ............... 318/269, 282, 299, 258, 318/266, 270, 271

[56] References Cited

U.S. PATENT DOCUMENTS

| | | | |
|---|---|---|---|
| 3,264,543 | 8/1966 | Yoshida | 318/266 |
| 3,344,327 | 9/1967 | Hutchinson et al. | 318/282 |
| 3,673,482 | 6/1972 | Davey | 318/266 |

*Primary Examiner*—Herman Hohauser

*Attorney, Agent, or Firm*—Armstrong, Nikaido, Marmelstein & Kubovcik

[57] ABSTRACT

An automatically-openable-and-closable-door operating apparatus uses a capacitor torque motor in order to automatically open or close the door. When opening or closing the door, an exciting coil of the motor is first short-circuited as the door approaches the open or close terminal so that the motor undergoes a dynamic braking to absorb an inertia of the door and to decelerate the door. Thereafter the short-circuiting or connection and the disconnection across the exciting coil are repeated alternately to have the motor produce a driving force and a braking force alternately so that the door may be brought into its opening or closing terminal position at a low speed without accompanied by shocks.

6 Claims, 4 Drawing Figures

AUTOMATICALLY-OPENABLE-AND-CLOSABLE-DOOR OPERATING APPARATUS

This invention relates to an automatically openable and closable door (hereinafter simply referred to as an automatic door) and in more particular, it relates to an operating apparatus for automatic doors which use a torque motor in the form of a capacitor motor.

A capacitor motor type torque motor (hereinafter simply referred to as a motor) has hitherto been proposed for driving the automatic door but it suffers a problem that the automatic door is imparted with a large shock owing to its inertia as it reaches the terminal. As a countermeasure for this problem, a dynamic braking system is considered wherein there is provided a separate DC power source and when opening or closing the door, an AC current and a DC current superimposed thereon from the DC power source are passed through the drive winding of the motor. This system, however, is expensive and complicated. Another dynamic braking system may be thought of wherein in parallel with the exciting capacitor of the motor is connected a half wave rectifier circuit which rectifies an AC voltage to produce a DC current and the AC current and the DC current superimposed thereon are passed through the drive winding of the motor. This latter system, however, suffers from the generation of uncomfortable beat due to pulsating currents and the beat causes the propulsive force or reserve torque to decrease to prevent the complete open-close operation, thus adversely affecting the operation of the door at the opening or closing terminal position. In addition, these DC braking systems are also disadvantageous in that the AC current superimposed with the DC current is passed through the drive winding of the motor and the drive winding tends to overheat and burn out.

Accordingly, an object of this invention is to provide an improved automatic door operating apparatus which can eliminate deficiencies that the automatic door suffers as it approaches the opening or closing terminal.

According to one aspect of the invention, the above object can be attained by providing an automatically-openable-and-closable-door operating apparatus using a capacitor torque motor in order to automatically open or close the door wherein when opening or closing the door, an exciting coil of the motor is first short-circuited as the door approaches the open or close terminal whereby the motor undergoes a dynamic braking to absorb an inertia of the door and to decelerate the door, and thereafter the short-circuiting and the disconnection across the exciting coil are repeated alternately to have the motor produce a driving force and a braking force alternately, whereby the door is brought into its opening or closing terminal position at a low speed without accompanied by shocks.

Other objects, features and advantages of the invention will become apparent from the following description of a preferred embodiment with reference to the accompanying drawings in which.

Prior to describing a preferred embodiment of the invention, a general description of an automatic door operating apparatus to which the invention is applicable will be given by referring to FIG. 1.

Figure 1:
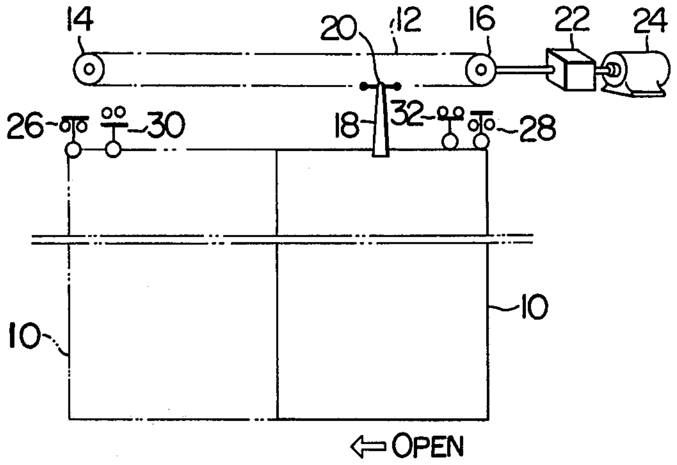
FIG. 1 is a schematic diagram of an automatic door operating apparatus to which the invention is applied.

As shown in FIG. 1, a sliding type door 10 travels between a first position designated at a chained line at which the door is fully opened and a second position designated at a solid line at which the door is fully closed. The door 10 is normally held in the second position. An endless chain 12 for driving the door 10 is applied on a pair of sprocket pulleys 14 and 16, and the door 10 engages, at its portion 18, a portion 20 of the endless chain 12 so that the door 10 is driven by the movement of the chain 12. One of the paired sprocket pulleys 14 and 16, for example the pulley 16, is coupled with a driving shaft of a motor 24 through a speed reduction unit 22 so as to be rotated by the motor 24 to move the chain 12. Limit switches 26, 28, 30 and 32 are cooperatively associated with the door 10 at its different positions. The limit switch 26 is a normally-closed limit switch which is actuated to open when the door is fully opened at the first position. The limit switch 28 is a normally-closed limit switch which is actuated to open when the door is fully closed at the second position. The limit switch 30 is a normally-opened limit switch which is actuated to close when the door, which is travelling toward the first position, reaches a third position in slight advance of the first position. The switch 30 continues to be closed as far as the door 10 runs between the third and first positions. The limit switch 32 is a normally-opened limit switch which is actuated to close when the door, which is being closed, reaches a fourth position in slight advance of the second position. The switch 32 continues to be closed as far as the door 10 runs between the fourth and second positions.

Figure 2:
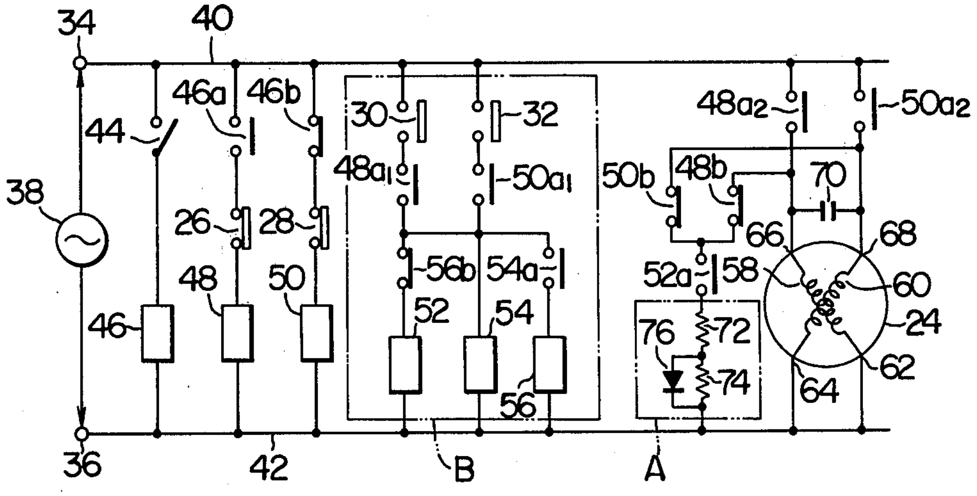
FIG. 2 is a circuit diagram of an automatic door operating apparatus embodying the invention.

Referring to FIG. 2, there is shown, by way of a mere example, a circuit diagram of the automatic door operating apparatus of FIG. 1, in which the same component elements as those of FIG. 1 are designated by the same reference numerals. As shown in FIG. 2, the apparatus comprises a pair of input terminals 34 and 36 fed by an external AC power source 38 and leads 40 and 42 extending from the input terminals 34 and 36, respectively.

A switch 44 is adapted to sense a person who is approaching the door 10 and may take the form of a so-called mat switch, for example, which is a normally-opened switch actuatable to close when the person steps on a mat located near each of the entrance and exit to the door. The switch 44 acts as a start switch for the operation to open the door. An electromagnetic relay 46 has a normally-opened contact **46*a*, a normally-closed contact 46*b* and an exciting coil connected in series with the normally-opened contact of the starting switch 44 between the leads 40 and 42. When the starting switch 44 is actuated to close its normally-opened contact, the relay 46** is energized.

An electromagnetic relay 48 has a first normally-opened contact $48a_1$, a second normally-opened contact $48a_2$ and a normally-closed contact **48*b*. An exciting coil of this relay 48 is connected in series with the normally-opened contact 46*a* of relay 46 and the normally-closed limit switch 26 between the leads 40 and 42. An electromagnetic relay 50 has a first normally-opened contact $50a_1$, a second normally-opened contact $50a_2$ and a normally-closed contact 50*b*, the exciting coil of which relay 50 is connected in series with the normally-closed contact 46*b* of relay 46 and the normally-closed limit switch 28 between the leads 40 and 42**.

An electromagnetic relay 52 has a normally-opened contact **52*a*. An electromagnetic relay designated at reference numeral 54 is a time limit electromagnetic relay having a normally-opened contact 54*a*. An electromagnetic relay designated at reference numeral 56 is a flasher electromagnetic relay having a normally-closed contact 56*b*. The normally-opened contact 54*a* of relay 54 is actuated to close when a predetermined time has elapsed after the energization of the exciting coil of the relay 54. The normally-closed contact 56*b* respects to chatter at a predetermined repetitive rate and duty cycle as far as the exciting coil of relay 56 is energized. The relay 52 has an exciting coil connected in series with the normally-opened limit switch 30, the first normally-opened contact 48$a_1$ of relay 48, and the normally-closed contact 56*b* of relay 56 between the leads 40 and 42. The relay 54 has an exciting coil connected in series with the normally-opened limit switch 32 and the first normally-opened contact 50$a_1$ between the leads 40 and 42. A juncture between the normally-opened contact 48$a_1$ and the normally-closed contact 56*b* is connected to a juncture between the normally-opened contact 50$a_1$ and the exciting coil of relay 54. The exciting coil of relay 56 is connected across the exciting coil of relay 54 through the normally-opened contact 54*a* of the relay 54. A motor 24 has windings 58 and 60 connected at respective one ends 62 and 64 to the lead 42. The respective other ends 66 and 68 of windings 58 and 60 are connected to the lead 40 through the second normally-opened contact 48$a_2$ of relay 48 and the second normally-opened contact 50$a_2$ of relay 50. Connected between the other ends 66 and 68 is a starting capacitor 70. The other end 66 of winding 58 is also connected to the lead 42 through a series connection of the normally-closed contact 48*b* of relay 48, the normally-opened contact 52*a* of relay 52 and resistors 72 and 74. On the other hand, the other end 68 of winding 60 is also connected to the lead 42 through a series connection of the normally-closed contact 50*b* of relay 50, the normally-opened contact 52*a* of relay 52 and the resistors 72 and 74. The resistor 74 is shunted with a diode 76 with the polarity as shown in FIG. 2**.

Figure 3:
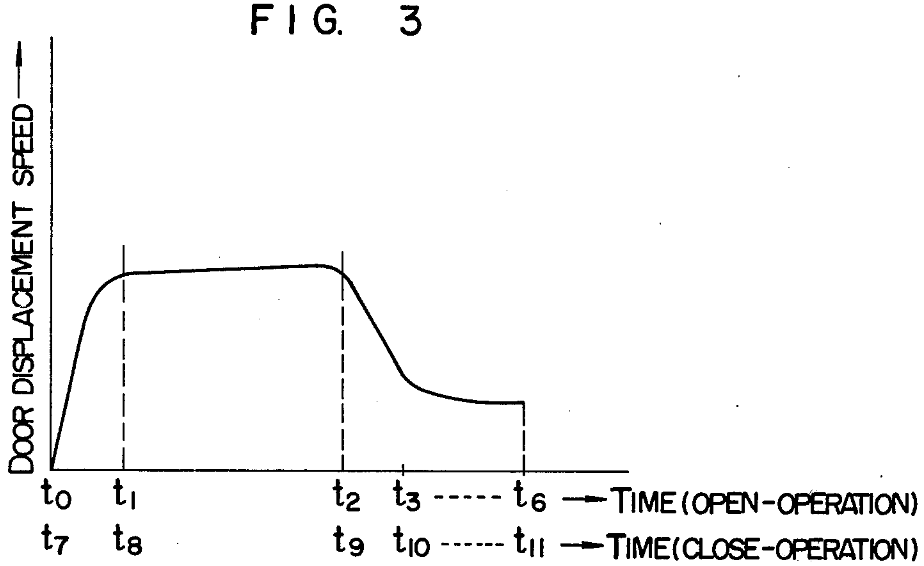
FIG. 3 is a graph showing an operational characteristic curve of a motor operating according to the invention.
Figure 4:
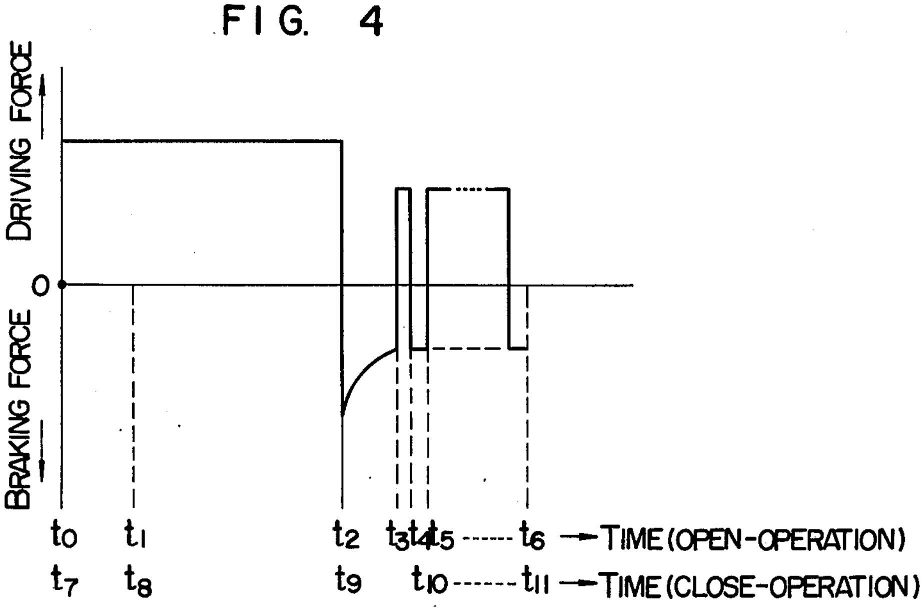
FIG. 4 is a graph showing an open-close speed characteristic curve of the automatic door according to the invention.

The operation of this circuit will now be described with reference to FIGS. 2, 3 and 4. When the door 10 is fully closed at the second position as shown in FIG. 1, on-off state of all the contacts corresponds to a normal state as shown in FIG. 2 except that the normally-closed limit switch 28 is actuated to be in an open-state and the normally-opened limit switch 32 is actuated to be in a closed-state. Accordingly, it will easily be understood that all of the relays 46, 48, 50, 52, 54 and 56 are not excited and in their normal states. When a person approaches the door and the normally-opened switch 44 is closed by sensing the approach, the relay 46 is excited to close its normally-opened contact **46*a* and open its normally-closed contact 46*b* (this instant is represented by $t_o$). As a result, a current is passed to the exciting coil of the relay 48 through the normally-closed limit switch 26 in its closed-state and the normally-opened contact 46*a* of relay 46 also in its closed-state so that the relay 48 is excited to close its first and second normally-opened contacts 48$a_1$ and 48$a_2$ and to open its normally-closed contact 48*b*. Consequently, the winding 58 of the motor 24 is fed with a current through the second normally-opened contact 48$a_2$ of relay 48 now in its closed-state and the winding 60 is fed with a current through the contact 48$a_2$ in its closed-state and the capacitor 70, thereby the motor 24 being rotated in a direction that the door 10 is opened (hereinafter referred to as forward direction). It will be appreciated that the winding 58 acts as a main winding and the winding 60** as an auxiliary winding under this condition.

As soon as the motor 24 is rotated in the forward direction and the door 10 begins to leave from the second position in the arrowed direction shown in FIG. 1, that is, in the door-opening direction, the normally-closed limit switch 28 which has been actuated to be in its open-state is deactivated to return to its closed-state. The relay 50, however, will not be excited since the relay 46 previously excited maintains its normally-closed contact **46*b* at its open-state. The other relays are maintained at their normally states. In consequence, with the normally-closed contact 50*b* of relay 50 now closed and the normally-closed contact 48*b* now opened, the capacitor 70 is not short-circuited through these relay contacts 50*b* and 48*b* so that the motor 24 which has reached a predetermined constant speed continues to rotate in the forward direction at the predetermined speed and hence the door 10 runs at a constant speed in the door-opening direction toward the first position. Then, even when the normally-opened limit switch 32 is deactivated returning to its open-state by the door 10 which is passing through the fourth position at an instant $t_4$, this deactivation will not change the energization of each relay and hence the motor 24 is allowed to further rotate in the forward direction at the constant speed, so that the door 10** continues to run in the door-opening direction.

Thereafter, when the door 10 reaches the third position at an instant $t_2$, the normally-opened limit switch 30 is actuated to close its contact. With the normally-opened limit switch 30 now closed, a current is fed to the exciting coil of the relay 52 through the switch 30, first normally-opened contact 48$a_1$ of relay 48 now in its closed-state and the normally-closed contact **56*b* of relay 56 now in its closed-state to energize the relay 52 which in turn closes its normally-opened contact 52*a*. With the closure of normally-opened contact 52*a*, the winding 60 of the motor 24 is shunted with a circuit including the resistors 72 and 74 and diode 76 by way of the normally-closed contact 50*b* now in its closed-state and the contact 52*a* just closed. This leads to a dynamic braking of the motor 24, causing the motor 24 to decelerate rapidly. An optimum dynamic braking can be obtained by adjusting resistance values of the resistors 72 and 74. In this sense, the resistors 72 and 74 together with diode 76 constitute a braking force adjusting circuit (a block A encircled by a chained line in FIG. 2**).

It will be seen that the relay 54 is excited concurrently with the energization of the relay 52. However, the relay 54 in the form of a time limit relay is prevented to actuate its normally-opened contact **54*a* to close before a predetermine time set for the relay 54 has elapsed, thus preventing the energization of the relay 56. As the time proceeds from the instant $t_2$ to instant $t_3$ at the termination of the predetermined time set for the time limit relay 54, the normally-opened contact 54*a* of relay 54 is actuated to be in its closed-state thereby to excite the relay 56. With the energization of the relay 56, its normally-closed contact 56*b* is actuated to open so that the relay 52 is deenergized to open its normally-opened contact 52*a*. Accordingly, the braking force adjusting circuit A which has been shunted with the winding 60 by way of the contacts 50$b$ and 52$a$ is disconnected. Thus, the dynamic braking disappears and the winding 60 again acts as the auxiliary drive winding to generate the driving force. However, the relay 56 is a flasher relay and its normally-closed contact 56$b$ repeats to take its open-state and closed-state alternately with a predetermined duty cycle. Preferably, the repetitive frequency and duty cycle may be adjustable. When a predetermined open-state period from $t_3$ to $t_4$ has elapsed, the normally-closed contact 56$b$ of relay 56 is returned to its on-state at the instant $t_4$ so that the relay 52 is again energized to close its normally-opened contact 52$a$, thereby again bringing the motor into the dynamic braking state. At a instant $t_5$ at which the predetermined closed-state period of the contact 56$b$ terminates, the contact 56$b$ is opened to deenergize the relay 52 which in turn opens its normally-opened contact 52$a$, thereby causing the motor to generate the driving force. While the contact 56$b$ repeats its closed-state and open-state several times, the door reaches the first position at an instant $t_6$. In this sense, a block B encircled by a chained line in FIG. 2** constitutes a speed limiting circuit.

When the door 10 reaches the first position, the normally-closed limit switch 26 is actuated to open its contact. With the normally-closed limit switch 26 now opened, a feeding circuit for the relay 48 is opened so that the relay 48 is deenergized to open its first and second normally-opened contacts 48$a_1$ and 48$a_2$ along with closure of its normally-closed contact 48$b$. As a result, the relays 52, 54 and 56 are deenergized and hence their normally-opened contact 52$a$, normally-opened contact 54$a$ and normally-closed contact 56$b$ return to open-state, open-state and closed-state, respectively. At the same time, the capacitor 70 is short-circuited through the normally-closed contacts 50$b$ and 48$b$ now both in their closed-state so that the motor stops ultimately.

Next, the person who has been stepping on the mat at the entrance or exit to the door passes through the entrance, leaving from the mat, and then the normally-opened switch 44 is opened so that the relay 46 is deenergized to open its normally-opened contact 46$a$ and close its normally-closed contact 46$b$. When the normally-closed contact 46$b$ returns to its closed-state, the relay 50 is energized through the normally-closed contact 46$b$ of relay 46 and normally-closed limit switch 28, both being now in their closed-state, to close its first and second normally-opened contacts 50$a_1$ and 50$a_2$ and open its normally-closed contact 50$b$. As a result, the winding 60 of motor 24 is fed through the closed contact 50$a_2$ whereas the winding 58 is fed through the contact 50$a_2$ and the capacitor 70 and hence the motor 24, as a capacitor motor, is started. Obviously, because of both the contacts 48$a_2$ and 50$b$ now in their open-state, the capacitor 70 will not be short-circuited. Moreover, because of the contact 52$a$ being now in its open-state, the generation of the dynamic braking is prevented. Under these conditions, the winding 60 acts as a main winding and the winding 58 acts as an auxiliary winding so that the motor rotates in such a direction that the door is caused to close (hereinafter referred to as backward direction). In this manner, the backward rotation of the motor 24 causes the door 10 to run toward the second position. When the door 10 is running in the door-closing direction the running speed of door 10 and the driving force-braking force characteristic of motor 24 vary with time in a similar manner to FIGS. 3 and 4. Therefore, reference is made again to FIGS. 3 and 4. When the door 10 has passed through the third position at an instant $t_8$ in the door-closing direction, the normally-opened limit switch 30 is returned to its open-state. But, because of the first normally-opened contact 48$a_1$ of relay 48 now its open-state, the energization state of each relay remains unchanged.

Thereafter, the motor 24 rotates at a predetermined constant speed and the door 10 proceeds to close under the application of a constant driving force. When the door 10 returns to the fourth position at an instant $t_9$ with the normally-opened limit switch 32 actuated to be in its closed-state, the relay 52 is energized through the closed limit switch 32 and the closed contacts 50$a_1$ and 56$b$ to close its normally-opened contact 52$a$. Accordingly, the winding 58 of motor 24 is shunted with the dynamic braking adjusting circuit A by way of the contacts 48$b$ and 52$a$ now in their closed-state and the motor 24 is brought into the dynamic braking mode. The time limit relay 54 is energized concurrently with the relay 52 but its normally-opened contact 54$a$ remains opened before the predetermined time has elapsed, as described hereinbefore. As the time proceeds from instant $t_9$ to instant $t_{10}$ at which the predetermined time set for relay 54 terminates, the normally-opened contact 54$a$ of the relay 54 is closed to energize the flasher relay 56 so that the state of motor 24 is alternated between the driving force generating mode and the dynamic braking mode as having already been explained with reference to the door opening operation. Ultimately, when the door 10 is returned to the second position at a instant $t_{11}$, the normally-closed limit switch 28 is actuated to open thereby to deenergize the relay 50 which in turn returns its first and second normally-opened contacts 50$a_1$ and 50$a_2$ to their open-state and its normally-closed contact 50$b$ to its closed-state. With the closure of normally-closed contact 50$b$, the normally-closed contact 48$b$ now in its closed-state cooperates to short-circuit the capacitor 70, thereby causing the motor 24 to stop ultimately.

The invention has been described in the foregoing by referring to the closing operation of the door wherein the door 10 is once brought to the full open position, i.e., the first position and then stopped thereat and thereafter, the switch 44 is opened to close the door. However, it will be appreciated that even when the switch 44 is released by the person who is passing through the mat or leaving therefrom before the door 10 reaches the first position, the door is then caused to close in a similar manner. Assume that the switch 44 is opened immediately after the instant $t_2$. Thus, at the instant $t_2$, the relays 46 and 48 are energized, the relay 50 is deenergized and the relay 52 is energized. The time limit relay 54 is also energized but its normally-opened contact 54$a$ still remains deactivated with the relay 56 deenergized. By opening the switch 44 immediately after this instant $t_2$, the relay 46 is deenergized, thus disabling the relay 48. With the deenergization of the relay 46, its normally-closed contact 46$b$ returns to its closed-state so as to enable the relay 50 in cooperation with the normally-closed limit switch 28 now in its closed-state. With the energization of the relay 50, the winding 58 which has previously been acting as the main winding changes to the auxiliary winding whereas the winding 60 which has been acting as the auxiliary winding changes to the main winding, so that the motor 24 begins rotating in the backward direction. It will be easily understood that the door closing operation as set forth hereinbefore follows this.

Alternatively, if another person steps on the mat to close again the switch 44 during the door closing operation, the relay 46 is enabled so that, at this instant, the motor 24 again begins to rotate in the forward direction to open the door 10.

While, in the foregoing description given by way of the preferred embodiment, the switch 44 was a switch disposed in the mat, i.e., so-called mat switch, it may obviously be replaced with an optical switch or the like which detects a person who is passing by a fixed location immediately before or behind the door 10. Furthermore, it will be appreciated for those ordinary skilled in the art that the electromagnetic relays in the circuit of FIG. 2 may be replaced with semiconductor devices wholly or partly.

As having been described hereinbefore, the invention provides an apparatus using the capacitor motor type torque motor for operating the automatic door especially at its opening or closing terminal, in which apparatus when opening or closing the door, the exciting coil of the motor is first short-circuited as the door runs near the open or close terminal whereby the motor undergoes the dynamic braking to absorb inertia of the door and decelerate the door, and thereafter the short-circuiting and the disconnection across the exciting coil are repeated alternately to have the motor produce the driving force and braking force alternately whereby the door is automatically applied with a braking force in direct proportion to the speed of motor near the terminal. Accordingly, the apparatus in accordance with the invention can completely be freed from such disadvantages as variation in the braking force due to wear in the conventional mechanical braking system, need for a separate DC power source in the DC dynamic braking system and generation of beat in the half wave rectifying system. In addition, the apparatus in accordance with the invention is simple as a whole and hence inexpensive, and is capable of performing a steady door operation near the open or close terminal thereby to prevent incomplete opening or closing of the door.

It should be noted that the invention may also be applicable to an automatic door operating apparatus using a capacitor start linear motor.

What is claimed is:

1. An automatically-openable-and-closable-door operating apparatus comprising:

- a door arranged to run between a first position at which the door is opened and a second position at which the door is closed and normally held in said second position;
- a capacitor motor mechanically coupled with said door and reversibly operable between a rotation in a forward direction for causing said door to run in a first travelling direction from said second position to said first position and a rotation in a backward direction for causing said door to run in a second travelling direction in opposite to said first travelling direction;
- approach sensing means for sensing a person who is present at a location spaced a predetermined distance from the door and actuated thereby;
- a first motor controlling means for causing said motor to rotate in said forward direction in response to the actuation of said approach sensing means;
- second motor controlling means for causing said motor to rotate in said backward direction in response to the non-actuation of said approach sensing means;
- third motor controlling means responsive to the presence of said door at said second position and the non-actuation of said approach sensing means to deenergize said motor and stop the rotation thereof;
- fourth motor controlling means responsive to the presence of said door at said first position and the actuation of approach sensing means to deenergize said motor and stop the rotation thereof;
- fifth motor controlling means operable when actuated to change, for a predetermined period, the normal operation state of said motor for producing a driving force to the dynamic braking mode for producing a braking force and thereafter to alternate the normal operation mode for producing the driving force and the dynamic braking mode for producing the braking force with a predetermined repetitive rate and a predetermined duty cycle;
- first means for actuating said fifth motor controlling means in response to the presence of said door, when running in said first travelling direction, between said first position and a third position spaced a predetermined distance from said first position;
- second means for actuating said fifth motor controlling means in response to the presence of said door, when running in said second travelling direction, between said second position and a fourth position spaced a predetermined distance from said second position;
- terminal means arranged for connection to an external AC power source; and
- means for electrically connecting said terminal means to said capacitor motor.

2. The apparatus according to claim 1, wherein said capacitor motor comprises first and second drive windings and a capacitor; and wherein when said motor is operated to rotate in said forward direction, an AC voltage from the AC power source through said terminal means is applied across said first winding directly and across said second winding through said capacitor whereas when operated to rotation said backward direction, the AC voltage is applied across said second winding directly and across said first winding through said capacitor.

3. The apparatus according to claim 2, wherein said fifth motor controlling means comprises a dynamic braking circuit including resistor means and a rectifier element connected across a part of said resistor means; and wherein said dynamic braking circuit is operatively connected across said second winding when said motor is operating to rotate in said forward direction and across said first winding when operating to rotate in said backward direction, whereby said motor is brought into said dynamic braking state.

4. The apparatus according to claim 3, wherein said terminal means comprises a pair of terminals, said first and second windings being connected at their one end in common to one of said paired terminals, said capacitor being connected between the other ends of said first and second windings; wherein said first motor controlling means comprises first contact means actuated in response to the actuation of said approach sensing means, first door position sensing means actuated by the presence of said door at said first position, and second contact means actuated in response to the actuation of said first contact means and the non-actuation of said first door position sensing means, said the other end of said first winding being operatively connected to the other of said paired terminals in response to the actuation of said second contact means; wherein said second motor controlling means comprises second door position sensing means actuated by the presence of said door at said second position and third contact means actuated in response to the non-actuation of said second door position sensing means and the non-actuation of said first contact means, said the other end of said second winding being operatively connected to said the other terminal in response to the actuation of said third contact means; wherein each of said third and fourth motor controlling means comprises means for short-circuiting said capacitor in response to the non-actuation of said second and the non-actuation of said third contact means; wherein said first means for actuating said fifth motor controlling means comprises third door position sensing means actuated by the presence of said door between said third and first positions, said fifth motor controlling means being actuated in response to the actuation of said third door position sensing means and the actuation of said second contact means; and wherein said second means for actuating said fifth motor controlling means comprises fourth door position sensing means actuated by the presence of said door between said fourth and second positions, said fifth motor controlling means being actuated in response to the actuation of said fourth door position sensing means and the actuation of said third contact means.

5. The apparatus according to claim 4, wherein said first, second, third and fourth door position sensing means comprises respectively a first normally-closed limit switch, a second normally-closed limit switch, a third normally-opened limit switch and a fourth normally-opened limit switch which are respectively actuated by the presence of said door at said first position, at said second position, between said first and third positions and between said second and fourth positions; wherein said first, second and third contact means comprises respectively first, second and third electromagnetic relays, said first electromagnetic relay having a normally-opened contact and a normally-closed contact, said second electromagnetic relay having first and second normally-opened contacts and a single normally-closed contact, and said third electromagnetic relay having first and second normally-opened contacts and a single normally-closed contact, said approach sensing means including a normally-opened switch which is connected in series with the exciting coil of said first electromagnetic relay between said paired terminals, said normally-opened contact of said first electromagnetic relay, said first normally-closed limit switch and the exciting coil of said second electromagnetic relay being connected in series between said paired terminals, said normally-closed contact of said first electromagnetic relay, said second normally-closed limit switch and the exciting coil of said third electomagnetic relay being connected in series between said paired terminals, said second normally-opened contact of said second electromagnetic relay being connected between said the other end of said first winding and said the other terminal, said second normally-opened contact of said third electromagnetic relay being connected between said the other end of said second winding and said the other terminal, and said respective normally-closed contacts of said second and third electromagnetic relays being connected in series between said the other ends of the first and second windings; and wherein said fifth motor controlling means comprises a fourth electromagnetic relay having a single normally-opened contact, a time limit electromagnetic relay having a single normally-opened contact which is actuated at a predetermined time after energized, a flasher electromagnetic relay having a single normally-closed contact which repeats actuation and non-actuation at said repetitive rate and said predetermined duty cycle when energized, and said dynamic braking circuit, one end of each of the exciting coils of said fourth electromagnetic relay, said time limit electromagnetic relay and said flasher electromagnetic relay being connected to said the one terminal, the other end of exciting coil of the time limit electromagnetic relay being connected to the other end of the exciting coil of said fourth electromagnetic relay through said normally-closed contact of said flasher electromagnetic relay and to the other end of the exciting coil of said flasher electromagnetic relay through said normally-opened contact of said time limit electromagnetic relay, said third normally-opened limit switch and said first normally-opened contact of said second electromagnetic relay being connected in series between said the other terminal and the other end of the exciting coil of said time limit electromagnetic relay, said fourth normally-opened limit switch and said first normally-opened contact of said third electromagnetic relay being connected in series between said the other terminal and the other end of the exciting coil of said time limit electromagnetic relay, said resistor means of said dynamic braking circuit having one end connected to said one terminal and the other end connected through said normally-opened contact of said fourth electromagnetic relay to a juncture between said respective normally-closed contacts of said second and third electromagnetic relays.

6. The apparatus according to claim 1 comprising a pair of sprocket pulleys, an endless chain applied on said paired sprocket pulleys, means for mechanically coupling a rotary shaft of one of said paired sprocket pulleys with a rotary shaft of said motor, a part of said chain engaging a part of said door.

* * * * *